United States Patent [19]
Naito

[11] Patent Number: 5,196,771
[45] Date of Patent: Mar. 23, 1993

[54] BRUSHLESS MOTOR DRIVE CIRCUIT

[75] Inventor: Hayato Naito, Komagane, Japan

[73] Assignee: Sankyo Seiki Mfg. Co., Ltd., Nagano, Japan

[21] Appl. No.: 821,797

[22] Filed: Jan. 16, 1992

[30] Foreign Application Priority Data

Jan. 21, 1991 [JP] Japan .................................. 3-20542

[51] Int. Cl.$^5$ ............................................. H02P 6/02
[52] U.S. Cl. .................................... 318/254; 318/138
[58] Field of Search ........................ 318/138, 254, 439

[56] References Cited

U.S. PATENT DOCUMENTS

| | | | |
|---|---|---|---|
| 4,442,386 | 4/1984 | Uchida et al. | 318/254 |
| 4,583,028 | 4/1986 | Angersbach et al. | 318/254 |
| 4,633,150 | 12/1986 | Inaji et al. | 318/254 |
| 4,879,498 | 11/1989 | Shinohara et al. | 318/254 |
| 4,987,352 | 1/1991 | Ishii | 318/254 |
| 5,043,642 | 8/1991 | Ohi | 318/254 |

Primary Examiner—Bentsu Ro
Attorney, Agent, or Firm—McAulay Fisher Nissen Goldberg & Kiel

[57] ABSTRACT

The coil middle point voltage of a brushless motor drive circuit is kept to a proper level and, therefore, brings forth stable and improved torque ripple correction effects even when the electric current gain of the source side and that of the sink side of the drive coils of the circuit are not well balanced. Such a brushless motor drive circuit comprises a position detecting element for detecting the rotary position of the rotor relative to the stator, a signal synthesizing circuit for synthesizing an m-phase soft switching signal out of the output of said position detecting element, a plurality of groups of transistors for switching the electric current supplied to said m-phase drive coils, a current control circuit for controlling the rate of electric current supplied to the m-phase drive coils by controlling the plurality of groups of transistors, a rate of electric current detecting resistor for detecting the drive coil current so as to negatively feed it back to said current control circuit, a circuit for supplying a reactive current to the rate of electric current detecting means during a period when the m-phase drive coils are not to be energized, an interrupting circuit for interrupting the reactive current during a period when m-phase drive coils are to be energized, a coil middle point detecting circuit for detecting the voltage applied to the middle points of the m-phase drive coils and a coil middle point feedback circuit for feeding back changes in the output of the coil middle point detecting circuit to the plurality of groups of transistors.

6 Claims, 8 Drawing Sheets

COIL MIDDLE POINT DETECTOR

COIL MIDDLE POINT DETECTOR

BRUSHLESS MOTOR DRIVE CIRCUIT

BACKGROUND OF THE INVENTION a) Field of Invention

This invention relates to a brushless motor drive circuit that uses soft switching signals to produce improved torque ripple correction effects.

b) Background Art

Figure 5A:
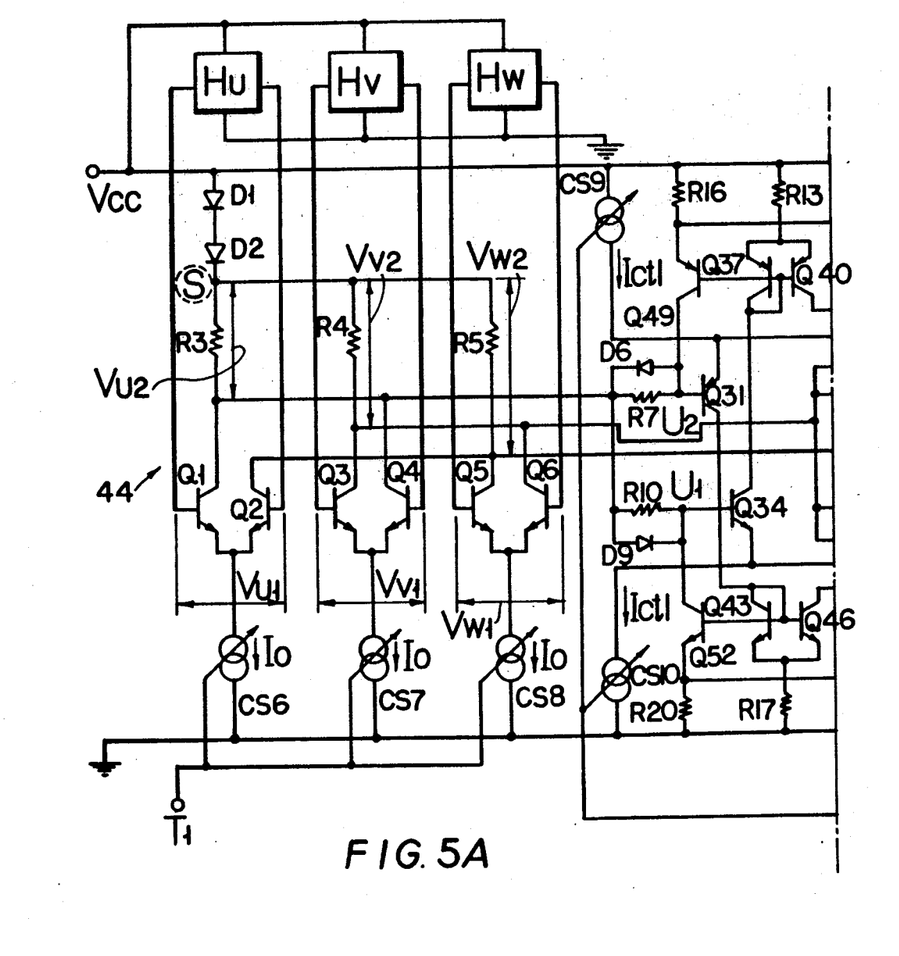
FIGS. 5A and 5B are circuit diagram of a known brushless motor drive circuit.
Figure 5B:
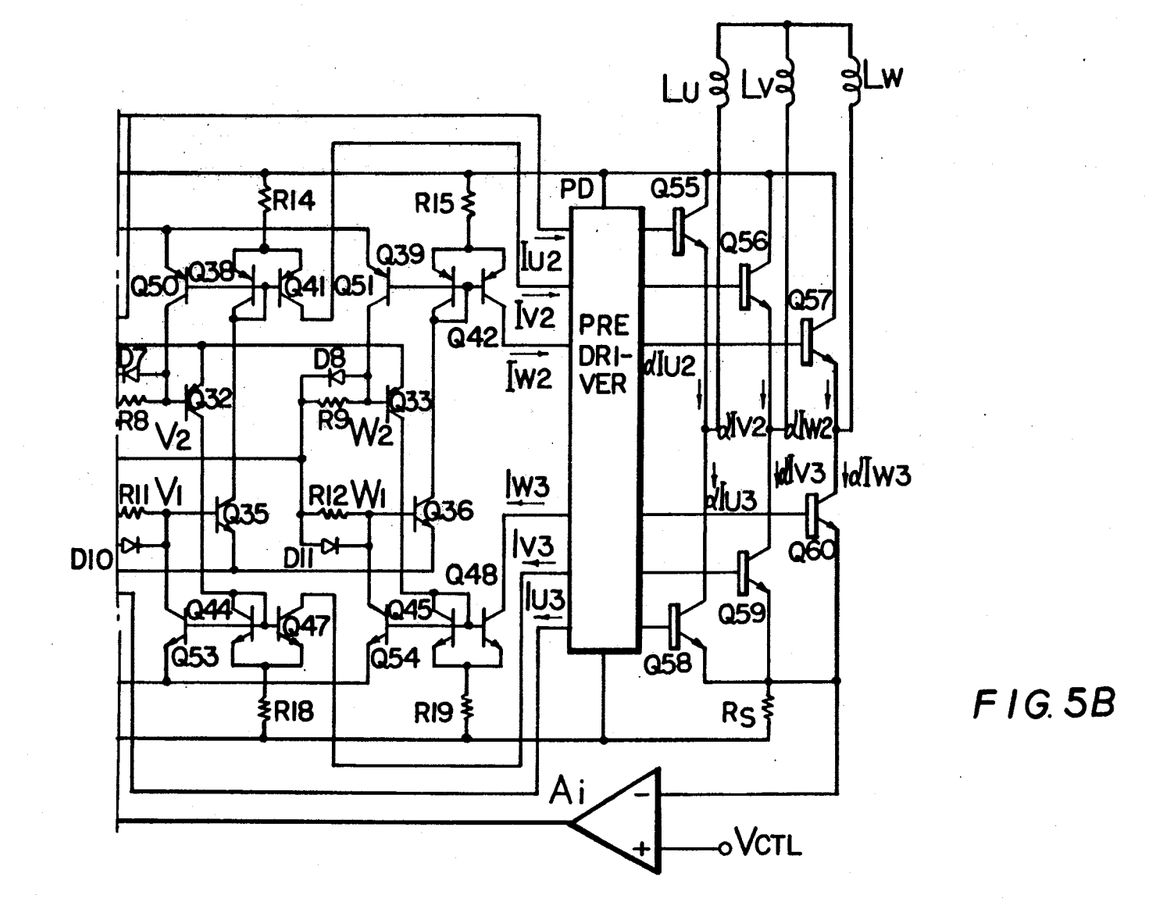

The inventor of the present application has filed a patent application for a brushless motor drive circuit that uses soft switching signals to produce improved torque ripple correction effects. This invention is disclosed in Published Japanese Patent Application No. Hei 1-278145. Firstly, this earlier invention will be described by referring to FIG. 5 of the accompanying drawings.

In FIG. 5, a position detecting means comprising Hall devices Hu, Hv and Hw is juxtaposed with a rotor (not shown) having 2×n magnetized poles and supplied with power by a power source. The rotor is juxtaposed with a 3-phase stator (not shown) comprising three drive coils Lu, Lv and Lw arranged for a 3-phase configuration and urged to rotate by this stator. The Hall devices Hu, Hv and Hw detect the rotary position of the rotor comprising a rotor magnet (not shown) having 2×n magnetized poles and selectively generates three sinusoidal wave signals Vu, Vv and Vw whose phases are differentiated from one another by 120° as shown in FIG. 2(a) depending on the rotary position of the rotor relative to the stator.

Transistors Q1 through Q6, variable current sources CS6 through CS8 for generating an electric current IO, resistors R3 through R5 equally having a resistance Ro and diodes D1 and D2 constitute a Hall amplifying circuit and, at the same time, a signal synthesizing circuit 44. The variable current sources CS6 through CS8 generate an electric current Io that corresponds to the input voltage applied by an adjuster terminal T1 and can be adjusted to an arbitrarily set level by modifying the input voltage from the adjuster terminal T1.

Figures 2A, 2B:
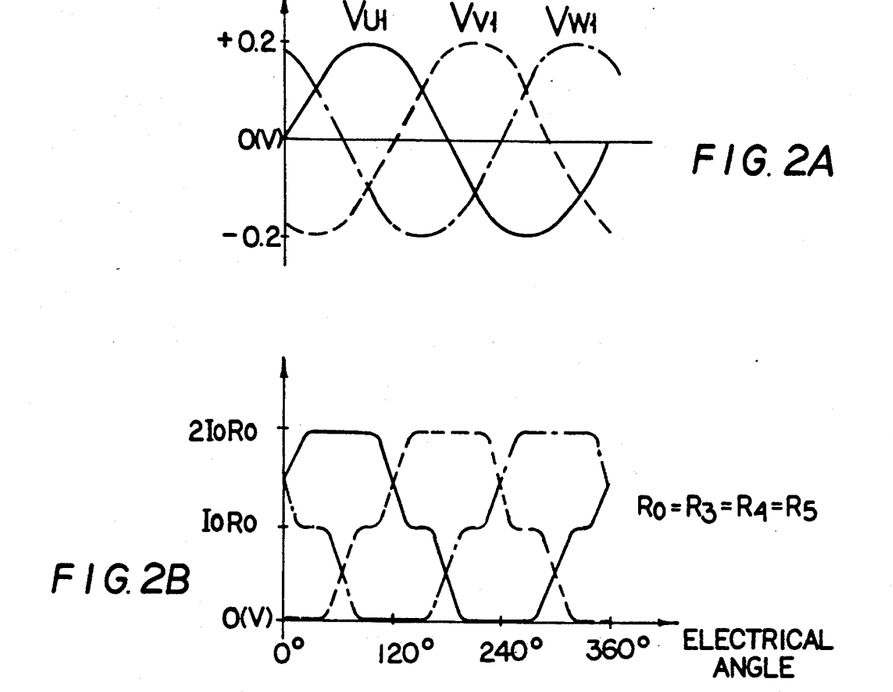
FIGS. 2A and 2B are diagrammatic illustration of the waveform of output signals and that of soft switching signals of the position detecting means of the embodiment of FIG. 1.
Figures 3A, 3B:
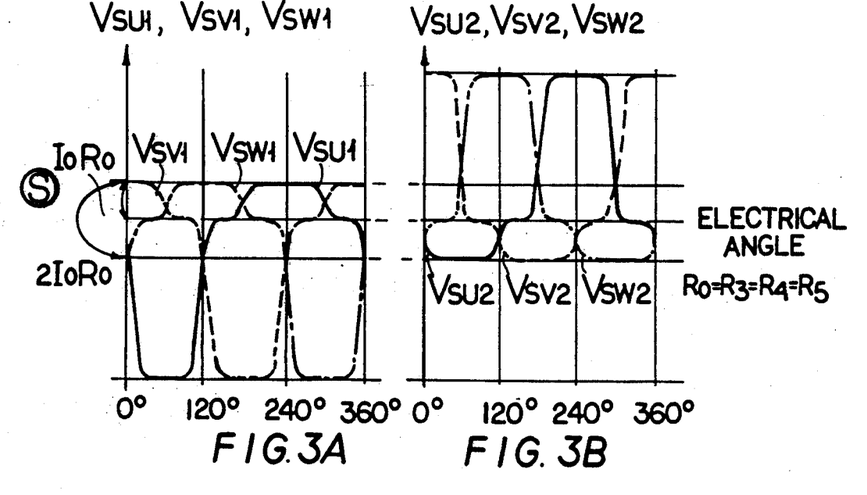
FIGS. 3A and 3B are diagrammatic illustration of the waveform of signals in the initial portions of the coil drive circuit of the embodiment of FIG. 1.

The signal synthesizing circuit 44 amplifies the output signals Vu, Vv and Vw of the Hall devices Hu, Hv and Hw and logarithmically compresses them so that the signals have the waveforms reduced flat at and near the inflection points to become somewhat rectangular pulse-like signals and are synthesized to produce three phase differentiated soft switching signals Vu2, Vv2 and Vw2 having a waveform as shown in FIG. 2(b). Differently stated, the output signals Vu, Vv and Vw of the Hall devices Hu, Hv, Hw are amplified by the transistors Q1 through Q6 and the collector outputs of the transistors Q1 and Q4 are synthesized to become a soft switching signal Vu2 while the collector outputs of the transistors Q3 and Q6 are synthetically processed to produce a soft switching signal Vv2 and those of the transistors Q2 and Q5 are synthesized into another soft switching signal Vw2.

The soft switching signals Vu2, Vv2 and Vw2 from the signal synthesizing circuit 44 then pass through respective resistors R7 through R12 and are converted into electric currents by a 3-differential amplifier comprising PNP-type transistors Q31 through Q33, NPN-type transistors Q34 through Q36 and variable current sources CS9 and CS10 and the electric currents are amplified by the same 3-differential amplifier. The output currents Iu2, Iv2 and Iw2 as well as Iu3, Iv3 and Iw3 of the 3-differential amplifier are applied to a predriver PD by way of a mirror circuit comprising transistors Q37 through Q42 and Q43 through Q48.

Then, for instance at phase U, the soft switching signal Vu2 from the amplifying and synthesizing circuit 44 passes through the resistors R7 and R10 and is converted into electric currents by the transistors Q31 and Q34, which amplify the currents, the output current of the collector of the transistor Q31 being fed back to the base (point U1) of the transistor Q34 by a mirror circuit constituted by transistors Q43 and Q52 and resistors R17 and R20, the output current of the collector of the transistor Q34 being, on the other hand, fed circuit constituted by transistors Q37 and Q49 and resistors R13 and R16. The level of the currents fed back to the bases of the transistors Q34 and Q31 is held significantly lower than that of the current Io from the variable current sources CS6, CS7 and CS8.

Similarly at phases V and W, the soft switching signals Vv2 and Vw2 from the amplifying and synthesizing circuit 44 respectively pass through the resistors R8, R11, and R9, R12 and are converted into electric currents by the transistors Q32, Q35 and Q33, Q36, which amplify the currents. The output currents of the collectors of the transistors Q32 and Q33 respectively are fed back to the bases (points V1 and W1) of the transistors Q35 and Q36 by mirror circuits respectively constituted by transistors Q44, Q53 and Q45, Q54 and resistors R18, R19 and R20. The output currents of the collectors of the transistors Q35, Q36 are on the other hand, fed back to the bases (points V2 and W2) of the transistors Q32 and Q33 by mirror circuits respectively constituted by transistors Q38, Q50 and Q39, Q51 and resistors R14, R15 and R16. The level of the currents fed back to the bases of the transistors Q32, Q33, Q35 and Q36 is held significantly lower than that of the current Io from the variable current sources CS6, CS7 and CS8.

With an arrangement as described above, voltages Vsu1, Vsv1 and Vsw1 respectively between the cathode s of the diode D2 and the points U1, V1 and W1 and voltages Vsu2, Vsv2 and Vsw2 respectively between the cathode s of the diode and the points U1, V2 and W2 will be as shown in FIG. 5. The combined diodes D6 and D9, D7 and D10 and D8 and D11 operate as amplitude limiters for limiting the amplitudes of the voltages Vsu1, Vsv1, Vsw1, Vsu2, Vsv2 and Vsw2.

Upon receiving an output signal from the predriver PD, a group of transistors Q55, Q56 and Q57 operates to cause source currents αIu2, αIv2 and αIw2 to flow into the respective drive coils Lu, Lv and Lw, whereas another group of transistors Q58, Q59 and Q60 operates to cause sink currents αIu3, αIv3 and αIw3 to flow out of the respective drive coils Lu, Lv and Lw. The source currents αIu2, αIv2 and αIw2 are obtained by multiplying by a the respective input currents Iu2, Iv2 and Iw2 of the predriver PD by means of the predriver PD and the group of transistors Q55, Q56 and Q57. The sink currents αIu3, αIv3 and αIw3 are obtained by multiplying by the respective input currents Iu3, Iv3 and Iw3 of the predriver PD by means of said predriver PD and the group of transistors Q5a, Q59 and Q60.

Electric current detecting resistor Rs detects any electric currents running through the drive coils Lu, Lv and Lw and converts them to voltages. Any voltage across the resistor Rs is negatively fed back to a current feedback amplifier Ai and compared with a motor speed control signal Vctl at an electric current feedback amplifier Ai and an error voltage representing the difference, if any, between them is utilized to regulate the variable current sources CS9 and CS10 and control the electric currents Ictl coming from them. Thus, the current Ictl is so controlled that the current flowing through the resistor Rs is kept constant as long as the control signal Vctl is kept constant and the constant electric current is supplied to the drive coils Lu, Lv and Lw.

Figure 4:
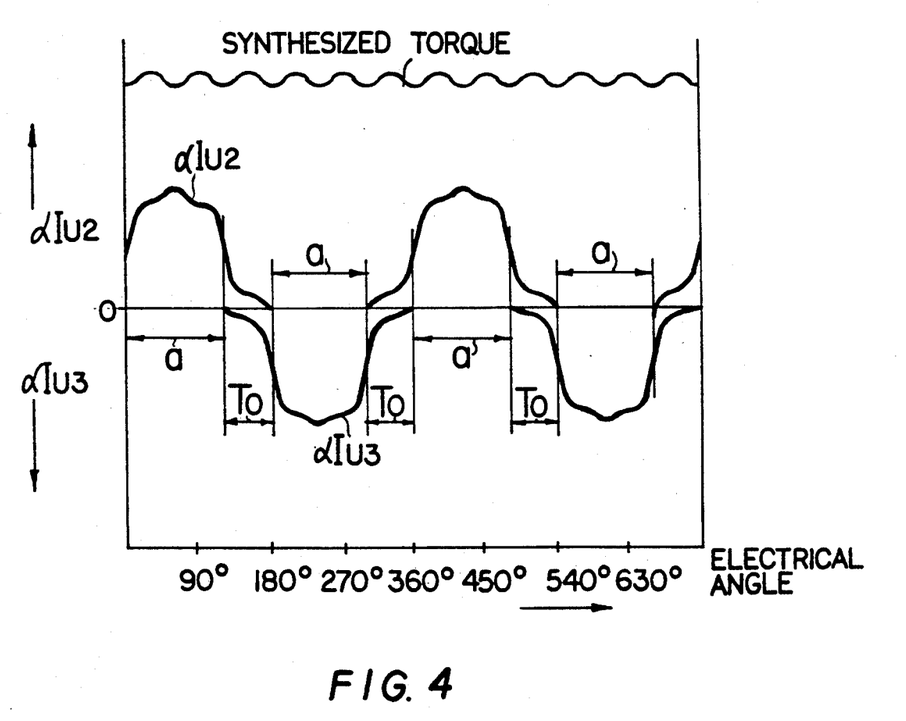
FIG. 4 is a diagrammatic illustration of the waveforms of drive coil currents and synthesized torque currents.

FIG. 4 schematically illustrates the waveforms of the source current αIu2 and the sink current αIu3 for the U-phase drive coil Lu determined by a simulating operation. It may be seen from FIG. 4 that the source current αIu2 and the sink current αIu3 flow through the current detecting resistor as reactive currents during current conductive periods To when no current flows through the U-phase drive coil Lu as the U-phase transistors Q55 and Q58 are turned on simultaneously, whereas they are never turned on simultaneously during current conductive periods a when a current flows through the U-phase drive coil Lu. A similar statement applies to V- and W-phases.

As described above, there arises a simultaneous on period To when, of the groups of transistors Q55 through Q57 and Q58 through Q60, those having the same phase are turned on and kept on simultaneously if the electric current Io of the variable current sources CS6 through CS8 is set to a low level and a reactive current flows through the current detecting resistor Rs during this simultaneous on period To. Thus, the means for generating simultaneous on periods is constituted by variable current sources CS6 through CS8, transistors for the Hall amplifying circuit Q1 through Q6, resistors R3 through R5 and transistors for the 3-differential amplifier Q31 through Q33 and Q34 through Q36. In the above example no reactive current flows during a current on period a and the means for breaking a reactive current during a current on period is constituted by resistors R7 through R12, diodes D6 through D11, transistors Q49 through Q54 and resistors R10 and R16. Besides, the means for controlling the electric currents supplied to the 3-phase drive coils Lu, Lv and Lw is constituted by current feedback amplifier Ai and variable current sources CS9 and CS10.

Referring to FIG. 4, if any simultaneous on currents flows through transistors having the same phase during a current on period a, those simultaneous on currents will be reactive currents that serve no purpose for driving the motor because those currents are inversely proportional to the amplitude of the soft switching signals Vu2, Vv2 and Vw2. Such reactive currents would interfere with the torque ripple correction effect of a brushless motor and can even aggravate the torque ripples when they deviate from one another.

A circuit as shown in FIG. 5, however, will have below listed effects because reactive currents are broken during any current on period a by the circuit.

(1) The reduction in the magnitude of synthesized torque can be minimized.
(2) Torque ripples can be further improved by reducing the amplitude of the soft switching signals Vu2, Vv2 and Vw2 because no reactive currents flow during current on periods a if they are reduced.
(3) Noises in the motor are lowered when the amplitude of the soft switching signals Vu2, Vv2 and Vw2 is reduced.
(4) Torque ripples are scarcely aggravated if elements of the drive circuits show deviations from standardized performances.

While a brushless motor drive circuit as shown in FIG. 5 shows excellent torque ripple correction effects as described above, there is still room for improvement. For one thing, both the electric conductivity of the power transistors on the source side and that of the power transistors on the sink side are controlled by a single electric current Ictl to switch the currents supplied to the drive coils and therefore, if the source side circuit and the sink side circuit have unbalanced current gains, the source and sink currents of the drive coils may differ. This will produce a saturated condition in the final stage of the circuits at the side having a higher gain, thereby distorting the waveforms of the electric currents flowing through the coils to degrade their torque ripple correction capability and consequently generating torque ripples to make the rotor of the motor rotate unevenly. For another thing, the voltage at the middle point of each of the coils can become unstable so as to generate torque ripples and, in some cases, cause the circuit to generate oscillation if the source side and the sink side of the drive circuit show a reversed relationship with regard to the magnitude of current gain of the drive circuit for each phase.

It is therefore the object of the present invention to resolve the above mentioned problems of the prior art and provide a brushless motor drive circuit having an improved ripple correction capability that can effectively maintain the voltage of the middle points of the coils to a desired level, or approximately half of the power source voltage, even if the current gain of the source side circuit section and that of the sink side circuit section are not balanced. This will avoid the final stage of both circuit sections of the drive circuit from becoming saturated and thereby generating undesired torque ripples and oscillations.

SUMMARY OF THE INVENTION

According to the present invention, the above object is achieved by providing a brushless motor drive circuit comprising a stator having m drive coils for m-phases, a rotor having a plurality of poles to be urged to rotate by the stator, position detecting means for detecting the rotary position of the rotor relative to the stator and generating an m-phase sine wave output signal representing the rotary position of the rotor, a signal synthesizing circuit for modifying the output signal of the position detecting means to a substantially rectangular pulse-like signal by logarithmically compressing the output signal to make it flat and synthesizing an m-phase soft switching signal from the pulse-like signal, a plurality of groups of transistors for switching the electric current supplied to said m-phase drive coils by the output signal of signal synthesizing circuit, a current control means for controlling the rate of electric current supplied to the m-phase drive coils by controlling the plurality of groups of transistors, a rate of electric current detecting resistor connected so as to negatively feed back the current control means, means for supplying a reactive current to the rate of electric current detecting means during a period when the m-phase drive coils are not to be energized, an interrupting means for interrupting the reactive current during a period when m-phase drive coils are to be energized, a coil middle point detecting means for detecting the voltage applied to the middle points of the m-phase drive coils and a coil middle point feedback means for feeding back changes in the output of said coil middle paint detecting means to the plurality of groups of transistors.

With a brushless motor drive circuit according to the invention, the position detecting means generates and transmits an m-phase sine wave output signal representing the rotary position of the rotor. Then, the signal synthesizing circuit modifies the output signal of the position detecting means to a substantially rectangular pulse-like signal by logarithmically compressing the output signal to make it flat and synthesizes an m-phase soft switching signal out of said pulse-like signal so that the electric current supplied to the m-phase drive coils is switched by the output signal of the signal synthesizing circuit. The rate of electric current supplied to the m phase drive coils by way of the plurality of groups of transistors is controlled by the current control means. The rate of electric current supplied to the drive coils is detected by the rate of electric current detecting resistor and negatively fedback to the current control means. A reactive current is supplied to the rate of electric current detecting means during a period when the m-phase drive coils are not to be energized and the reactive current is interrupted during a period when m-phase drive coils are to be energized. A coil middle point detecting means detects the voltage applied to the middle points of the m-phase drive coils and changes in the output of said middle point detecting means are fed back to the plurality of groups of transistors by ways of a coil middle point feedback means.

For a better understanding of the present invention, reference is made to the following description and accompanying drawings while the scope of the invention will be pointed out in the appended claims.

DETAILED DESCRIPTION OF THE INVENTION

A preferred embodiment of the invention will be described by referring to FIG. 1. Since most of the components of the circuit are identical with those of the circuit of FIG. 5, to which an extra circuit section is added for the purpose of the present invention, the common components are indicated by the same reference symbols, omitting any detailed description thereof, and only those components which are specific to the present invention will be described.

Figure 1A:
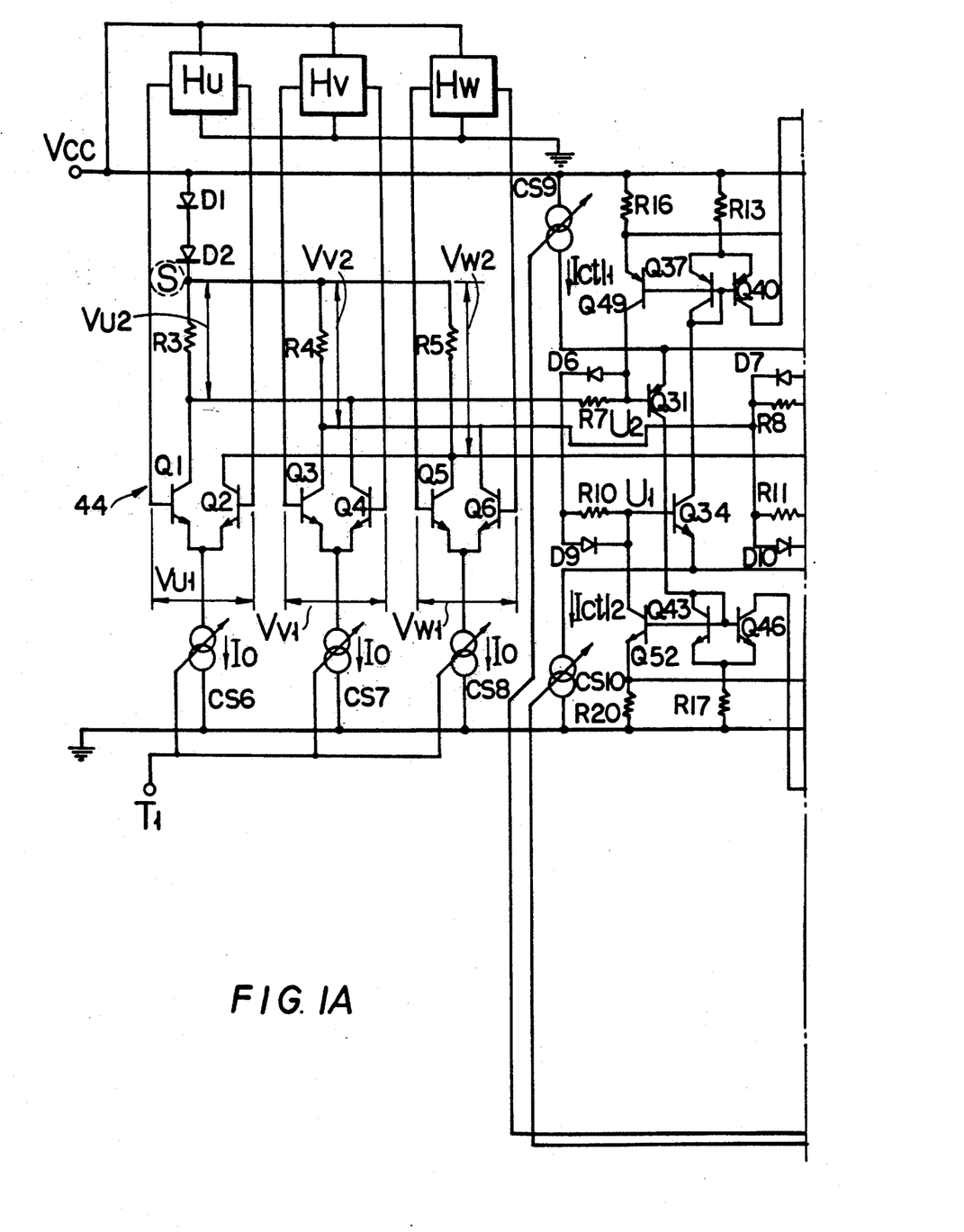
FIGS. 1A and 1B are circuit diagrams of an embodiment of the brushless motor drive circuit of the invention.
Figure 1B:
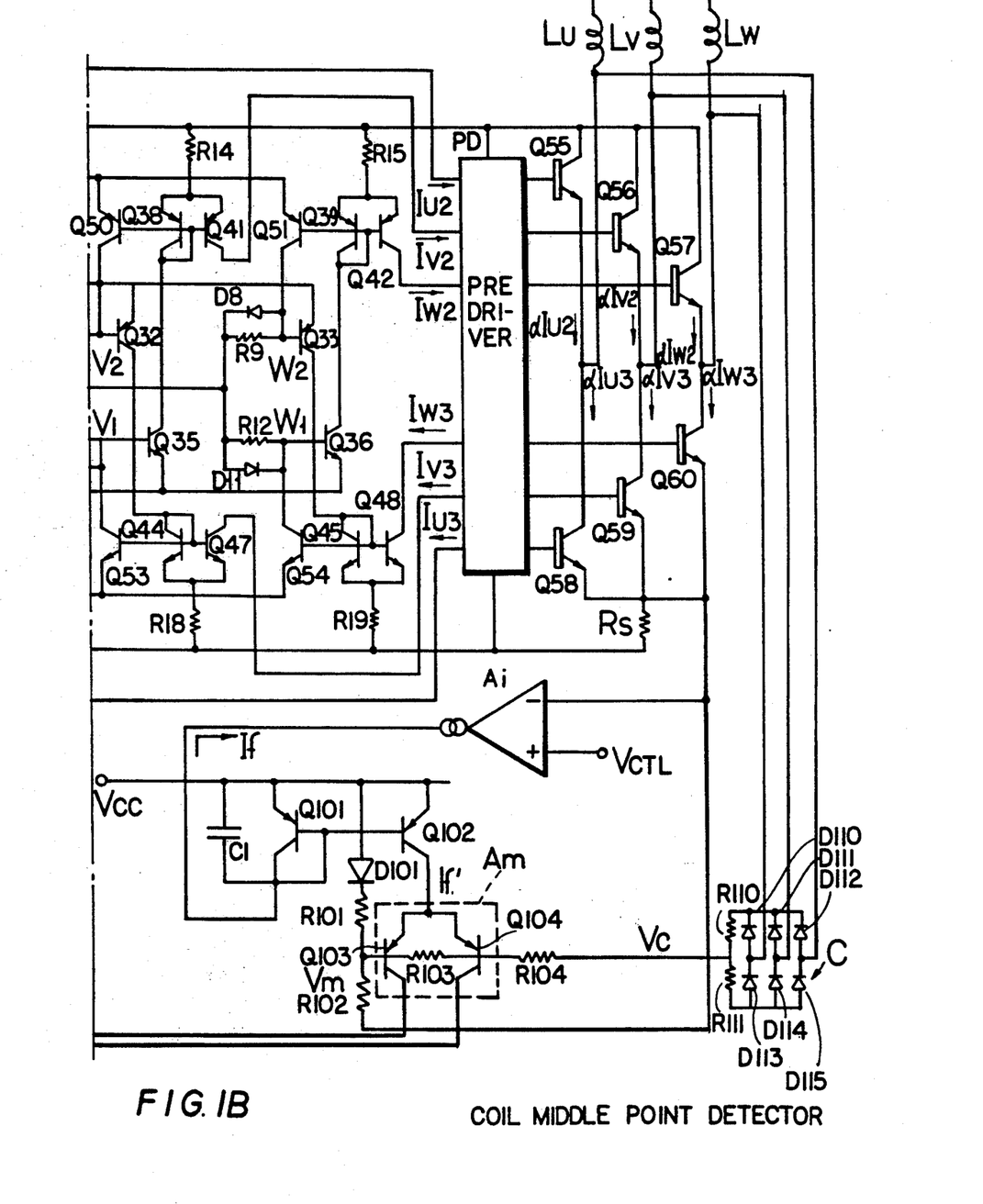

Referring to FIG. 1, the circuit is so arranged that the current If at the output terminal of a current feedback amplifier Ai becomes a bias current supplied to a coil middle point feedback amplifier Am by way of a mirror circuit constituted by PNP-type transistors Q101 and Q102. The coil middle point feedback amplifier Am comprises PNP-type transistors Q103 and Q104. An electric current If' which is proportional to the current If runs to the collector of the transistor Q102, a component of the mirror circuit, and the collector of the transistor Q102 is commonly connected to the emitters of the transistors Q103 and Q104 that constitute the coil middle point feedback amplifier Am.

A terminal of each of 3-phase drive coils Lu, Lv and Lw is connected to the input terminal of a coil middle point detector C so that any changes in the voltage at the middle point of each of the drive coils Lu, Lv and Lw can be detected by the coil middle point detector C. The coil middle point detector C detects the maximum value of the voltage wave of the three phase drive coils Lu, Lv, Lw by diodes D110 to D112. Diodes D113 to 115 detect the minimum value of the voltage wave of the three phase drive coils Lu, Lv, Lw.

Figure 6A:
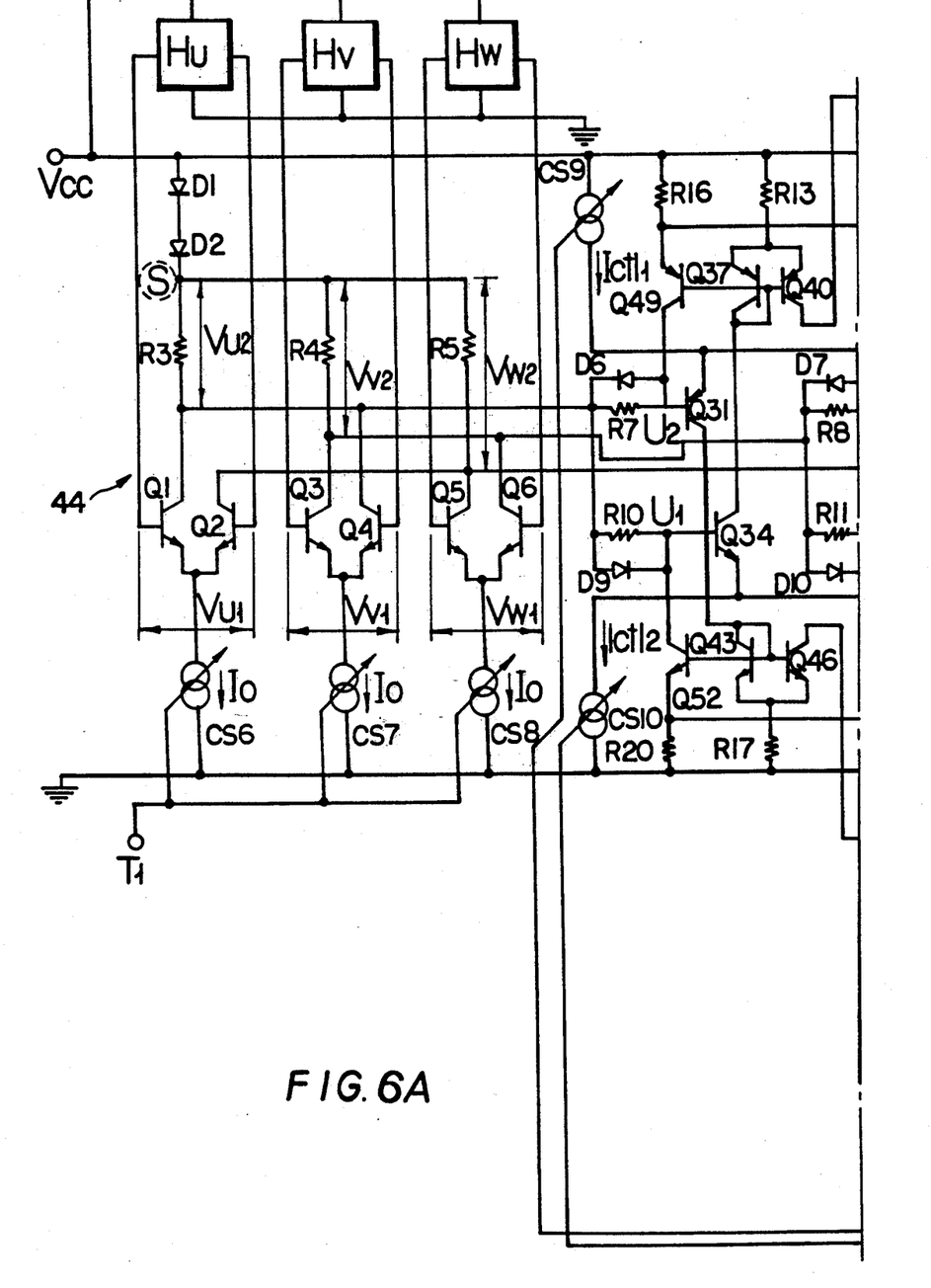
FIGS. 6A and 6B are another embodiment of this invention.
Figure 6B:
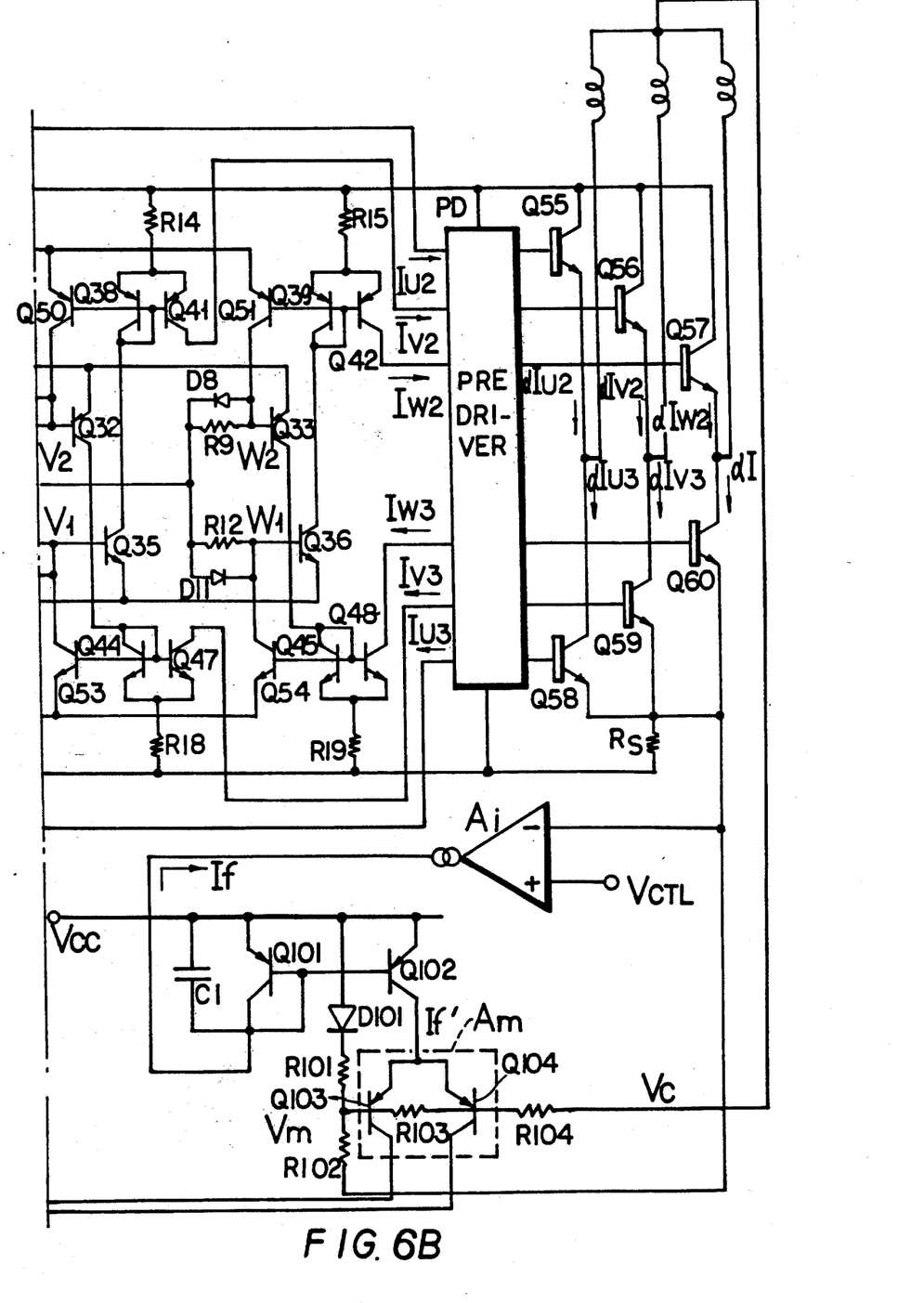

Resistors's R110, R111 detect a middle ($\frac{1}{2}$) voltage value between the maximum value and the minimum value. The middle voltage means the middle point voltage (Vc) of the drive coils Lu, Lv, Lw. The middle point voltage (Vc) can be obtained from a connecting portion of the drive coils directly as shown in FIG. 6. Any changes in the output voltage Vc of the coil middle point detector C is entered into the base of the transistor Q104 by way of a resistor R104 that takes the role of an input terminal of the coil middle point feedback amplifier Am.

A series circuit comprising a diode D101 and voltage dividing resistors R101 and R102 is connected between the power source and a current detecting resistor Rs for the 3-phase drive coils Lu, Lv and Lw and the voltage at the junction of the resistors R101 and R102 is applied to the transistor Q103 that plays the role of the other input terminal of the coil middle point feedback amplifier Am as coil middle point reference voltage Vm. A resistor R103 is arranged between the bases of the transistors Q103 and Q105. The resistors R103 and R104 are used to divide the differential voltage of the coil middle point reference voltage Vm and the output voltage Vc of the coil middle point detector C and regulate the middle point feedback gain of the coil middle point feedback amplifier Am.

The collector of the transistor Q103, which is a component of the coil middle point feedback amplifier Am, is connected to the control terminal of a variable current source CS9 to control the current Ictl$_1$ of the variable current source CS9, while the collector of the transistor Q104 which is also a component of the coil middle point feedback amplifier Am is connected to the control terminal of another variable current source CS10 to control the current Ictl$_2$ of the variable current source CS10. The transistors Q103 and Q104 of the coil middle point feedback amplifier Am control the respective collector current ratios 80 that the actual voltage Vc at the coil middle point is substantially equal to the coil middle point reference voltage Vm and consequently a coil middle point current feedback loop is formed by them. A capacitor Cl is arranged between the emitter and the collector of the transistor Q101 for phase compensation of the current feedback loop based on the current feedback amplifier Ai described earlier.

The embodiment as described above operates in a manner as described below particularly in terms of coil middle point feedback.

Assume that the current gain of the drive coils is high at the source side of the drive circuit and consequently the input current to the coils exceeds their output current. Then, the coil middle point voltage tends to rise to saturate the final stages of the source side of the drive circuit, trying to keep the balance of the coil input and output currents. Consequently, a condition of $Vm < Vc$ appears and the base voltage of the transistor QlG4 becomes higher than that of the transistor Q103 so as to increase the collector current of the transistor Q103 and conversely reduce that of the transistor Q104 because of the function of the differential amplifier. Then, the output current $Ictl_1$ of the variable current source CS9 increases with the increase in the collector current of the transistor Q103 to increase the output current of a PNP-type 3-differential amplifier constituted by transistors Q31 through Q33 and, by turn, the sink currents $\alpha Iu3$, $\alpha Iv3$ and $\alpha Iw3$ of the respective output terminals of the drive coils.

On the other hand, the output current $Ictl_2$ of the variable current source CS10 decreases with the decrease in the collector current of the transistor Q104 to decrease the output current of an NPN-type 3-differential amplifier constituted by transistors Q34 through Q36 and in turn the source currents $\alpha Iu2$, $\alpha Iv2$ and $\alpha Iw2$ of the respective output terminals of the drive coils. Differently stated, the current If which is proportional to the output current of the current feedback amplifier Ai is the sum of the collector current of the transistor Q103 and that of the transistor Q104 and either of the collector currents increases as the other decreases.

Since the input and output currents of the drive coils are well balanced without saturating the final stages of the drive circuit on the source side thanks to the operation as described above, any increase in the coil middle point voltage is eventually suppressed to show a desired current waveform at any of the output terminals of the coils as illustrated in FIG. 4.

With the arrangement of a coil middle point feedback loop as described above, the coil middle point voltage is always maintained to approximately half of the power source voltage and, therefore, the current at the output terminals of the coils is maintained to show a desired waveform without saturating the final stages of the coil drive circuit to produce stable and improved torque ripple correction effects and eliminate uneven rotation of the motor. Moreover, with a stabilized middle point voltage, the drive coil for the brushless motor is substantially set free from oscillation and hence operates safe and sound throughout its service life.

Additionally, since the coil middle point feedback gain product by the coil middle point feedback amplifier is kept to a rather low level because of the division of the input voltages (Vc-Vm) established by the resistors R103 and R104, the coil middle point feedback loop is substantially free from oscillation, making installation of a phase compensating capacitor needless.

The coil middle point detector C may be configured in a known manner. While the number of phases of the drive coil of the above embodiment is three, a drive coil having a different number of phases may also be used. Besides, the coil middle point feedback amplifier and members arranged at its periphery may be configured differently from the those of the above embodiment as long as they function in a same way.

As is apparent from the above description, since a brushless motor drive circuit according to the invention is provided with a coil middle point feedback loop, the coil middle point voltage is kept to a proper level and, therefore, the electric current at the output terminals of the coils shows a desired waveform without the necessity of saturating the final stages of the coil drive circuit to bring forth stable and improved torque ripple correction effects of a brushless motor drive circuit, which is free from oscillation and operates safely and stably throughout its service life.

While the foregoing description and drawings represent the preferred embodiments of the present invention, it will be obvious to those skilled in the art that various changes and modifications may be made therein without departing from the true spirit and scope of the present invention.

What is claimed is:

1. A brushless motor drive circuit comprising:
   a stator having drive coils for m-phases;
   a rotor having a plurality of poles and urged to rotate by the stator;
   position detecting means for detecting the rotary position of the rotor relative to the stator and for generating an m-phase sine wave-like output signal representing the rotary position of the rotor;
   a signal synthesizing circuit for modifying the output signal of said position detecting means to a substantially rectangular pulse-like signal by logarithmically compressing the output signal to make it flat and synthesizing an m-phase soft switching signal from said pulse-like signal;
   a plurality of groups of transistors for switching the electric current supplied to said drive coils by the output signal of said signal synthesizing circuit;
   current control means for controlling the rate of electric current supplied to said drive coils by controlling said plurality of groups of transistors;
   a rate of electric current detecting resistor connected so as to negatively feed back said current control means; means for supplying a reactive current to said rate of electric current detecting resistor during a period when said drive coils are not to be energized;
   interrupting means for interrupting said reactive current during a period when said drive coils are to be energized;
   coils middle point detecting means for detecting the voltage applied to the middle point of said m-phase drive coils; and
   coils middle point feedback means for feeding back changes in the output of said coils middle point detecting means to said plurality of groups of transistors.

2. A brushless motor drive circuit according to claim 1 wherein said coils middle point feedback means comprise a circuit which generates a reference voltage (Vm) of said coils middle point; and
   a coil middle point feedback amplifier which has as an input said reference voltage (Vm) and the output of said coils middle point detecting means (Vc).

3. A brushless motor drive circuit according to claim 1 wherein said coils middle point feedback means comprise a circuit which generates a reference voltage (Vm) of said coils middle point; and
   a coil middle point feedback amplifier which has as an input said reference voltage (Vm) and the output of said coil middle point detecting means (Vc), wherein the difference of said output (Vc) and said reference voltage (Vm) is divided by a resistor circuit and the divided output is supplied to said coil middle point feedback amplifier.

4. A brushless motor drive circuit according to claim 1 wherein said coils middle point feedback means comprise a circuit which generates a reference voltage (Vm) of said coils middle point; and a coil middle point feedback amplifier which has as an input said reference voltage (Vm) and the output of said coil middle point detecting means (Vc), wherein an output signal of said coil middle point feedback amplifier is connected to a variable current source.

5. A brushless motor drive circuit according to claim 1 wherein said coils middle point feedback means comprise a circuit which generates a reference voltage (Vm) of said coils middle point; and a coil middle point feedback amplifier which has as an input said reference voltage (Vm) and the output of said coil middle point detecting means (Vc), wherein a bias current of said coil middle point feedback amplifier (Am) is an output signal (If) of a current feedback amplifier which functions through a mirror circuit.

6. A brushless motor drive circuit comprising:

a stator having drive coils for m-phases;

a rotor having a plurality of poles and urged to rotate by the stator;

position detecting means for detecting the rotary position of the rotor relative to the stator and for generating an m-phase sine wave-like output signal representing the rotary position of the rotor;

a signal synthesizing circuit for modifying the output signal of said position detecting means to a substantially rectangular pulse-like signal by logarithmically compressing the output signal to make it flat and synthesizing an m-phase soft switching signal from said pulse-like signal;

a plurality of groups of transistors for switching the electric current supplied to said drive coils by the output signal of said signal synthesizing circuit;

current control means for controlling the rate of electric current supplied to said drive coils by controlling said plurality of groups of transistors;

a rate of electric current detecting resistor connected so as to negatively feed back said current control means; means for supplying a reactive current to said rate of electric current detecting resistor during a period when said drive coils are not to be energized;

interrupting means for interrupting said reactive current during a period when said drive coils are to be energized;

coils middle point detecting means for detecting the voltage applied to the middle point of said m-phase drive coils; and coils middle point feedback means for feeding back changes in the output of said coils middle point detecting means to said plurality of groups of transistors, wherein said coil middle point feedback means comprises two outputs, one output being connected to a source side of a coil current drive circuit and the other output being connected to a sink side of said coil current drive circuit.

* * * * *